US012643800B2

(12) United States Patent　　　　　(10) Patent No.: US 12,643,800 B2
Liao et al.　　　　　　　　　　　　　(45) Date of Patent: Jun. 2, 2026

(54) PRODUCTION METHOD OF NIOBIUM(V) OXIDE NANOCRYSTALS

(71) Applicant: TOKYO OHKA KOGYO CO., LTD., Kanagawa (JP)

(72) Inventors: YuehChun Liao, Kanagawa (JP); Kenichi Yamauchi, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 520 days.

(21) Appl. No.: 18/188,734

(22) Filed: Mar. 23, 2023

(65) Prior Publication Data

US 2023/0312362 A1　　Oct. 5, 2023

(30) Foreign Application Priority Data

Mar. 30, 2022　(JP) ................................. 2022-057521

(51) Int. Cl.
　*C01G 33/00*　　(2006.01)
　*B82Y 40/00*　　(2011.01)
(52) U.S. Cl.
　CPC .............. *C01G 33/00* (2013.01); *B82Y 40/00* (2013.01); *C01P 2002/72* (2013.01)
(58) Field of Classification Search
　CPC ..... C01G 33/00; B82Y 40/00; C01P 2002/72; C30B 29/16; C30B 7/10
　See application file for complete search history.

(56)　　　　　References Cited

PUBLICATIONS

Kominami et al., "Novel solvothermal synthesis of niobium(V) oxide powders and their photocatalytic activity in aqueous suspensions", J. Mater. Chem., 2001, 11, 604-609. (Year: 2001).*
Bayot et al., "Precursor Routes for the Preparation of Nb-Based Multimetallic Oxides," In: Progress in Solid State Chemistry Research, 2007, pp. 117-120. (Year: 2007).*
Hui Liu et al., "Hexagonal-like Nb2O5 Nanoplates-Based Photodetectors and Photocatalyst with High Performances", Scientific Reports, 5, 7716, Published on Jan. 12, 2015.

* cited by examiner

*Primary Examiner* — Anthony J Zimmer
(74) *Attorney, Agent, or Firm* — Rankin, Hill & Clark LLP

(57)　　　　　ABSTRACT

A production method of niobium(V) oxide nanocrystals is provided which is capable of obtaining niobium(V) oxide nanocrystals having a size of less than 100 nm in a state where an amorphous phase is less likely to be generated. The production method of niobium(V) oxide nanocrystals according to the present invention includes heating a mixture containing a pentaalkoxyniobium(V), water, and a water-soluble solvent to 255° C. or higher to allow a hydrothermal reaction to proceed, wherein alkoxy groups in the pentaalkoxyniobium(V) are independently an alkoxy group having 2 to 5 carbon atoms. A molar ratio between water and pentaalkoxyniobium(V) is preferably 0.20 or more. The hydrothermal reaction is preferably allowed to proceed at a pressure of 400 psi or more.

3 Claims, 1 Drawing Sheet

2θ (deg)

2θ (deg)

PRODUCTION METHOD OF NIOBIUM(V) OXIDE NANOCRYSTALS

This application is based on and claims the benefit of priority from Japanese Patent Application No. 2022-057521, filed on 30 Mar. 2022, the content of which is incorporated herein by reference.

BACKGROUND OF THE INVENTION

Field of the Invention

The present invention relates to a production method of niobium(V) oxide nanocrystals.

Related Art

A high refractive index material is used to form optical members. Such a high refractive index material is obtained using, for example, particles of metal oxide such as titanium oxide or zirconium oxide as a raw material. Examples of such metal oxide particles usable as a raw material of the high refractive index material also include niobium(V) oxide particles. An example of a production method of niobium(V) oxide particles is a solvothermal synthesis method using niobium(V) chloride as a raw material (Non-Patent Document 1).

Non-Patent Document 1: Scientific Reports, 2015, Vol. 5, p. 7716 (2015). <URL: //doi.org/10.1038/srep07716>

SUMMARY OF THE INVENTION

A conventional production method of niobium(V) oxide particles uses niobium(V) chloride as a raw material, and therefore corrosion may be caused by chloride ions remaining in resulting niobium(V) oxide particles. Further, such a conventional production method of niobium(V) oxide particles has the following drawbacks: it is difficult to obtain niobium(V) oxide particles having a size of less than 100 nm, amorphous phase niobium(V) oxide particles are generated, or niobium(V) oxide particles with low crystallinity are produced.

In view of these existing circumstances, the present invention has been made and an object thereof is to provide a production method of niobium(V) oxide nanocrystals, which is capable of obtaining niobium(V) oxide nanocrystals having a size of less than 100 nm in a state where an amorphous phase is less likely to be generated.

The present inventors have conducted intensive research to solve the above problems. As a result, the present inventors have found that the above-mentioned problems can be solved by obtaining niobium(V) oxide nanocrystals by heating a mixture containing a predetermined pentaalkoxyniobium(V), water, and a water-soluble solvent to 255° C. or higher to allow a hydrothermal reaction to proceed, and have accomplished the present invention. In more detail, the present invention provides the following.

One aspect of the present invention relates to a production method of niobium(V) oxide nanocrystals, including heating a mixture containing a pentaalkoxyniobium(V), water, and a water-soluble solvent to 255° C. or higher to allow a hydrothermal reaction to proceed, wherein alkoxy groups in the pentaalkoxyniobium(V) are independently an alkoxy group having 2 to 5 carbon atoms.

According to the present invention, the present invention can provide a production method of niobium(V) oxide nanocrystals, which is capable of obtaining single-crystal phase niobium(V) oxide nanocrystals having a size of less than 100 nm in a state where an amorphous phase is less likely to be generated.

DETAILED DESCRIPTION OF THE INVENTION

<Production Method of Niobium(V) Oxide Nanocrystals>

Figure 1:
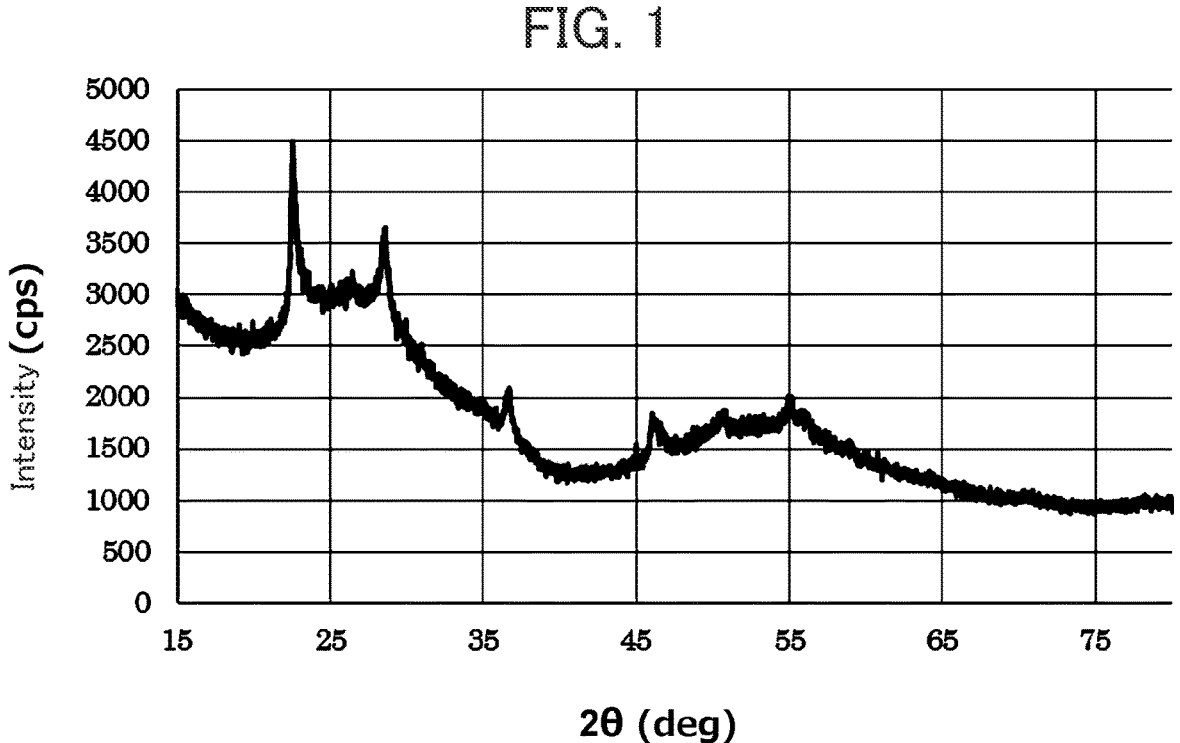
FIG. 1 is a graph showing the result of XRD measurement of niobium(V) oxide nanoparticles of Comparative Example 5.

A production method of niobium(V) oxide nanocrystals according to the present invention makes it possible to obtain niobium(V) oxide nanocrystals having a size of less than 100 nm. The production method makes it possible to obtain niobium(V) oxide nanocrystals having a size of preferably less than 20 nm, more preferably 18 nm or less, even more preferably 17 nm or less. In the present specification, the size of niobium(V) oxide nanocrystals refers to an average primary particle size calculated by Halder-Wagner method from the half width of a diffraction peak detected by X-ray diffraction measurement, that is, a crystallite size.

The crystal phase of niobium(V) oxide nanocrystals obtained by the production method according to the present invention is not particularly limited. Examples thereof include a TT phase, a T phase, a B phase, a P phase, an N phase, an R phase, an M phase, an H phase, and an I phase, and a TT phase is particularly easily obtained. On the other hand, the production method according to the present invention is less likely to produce amorphous phase niobium(V) oxide particles. The type of crystal phase can be determined by the position on the 2θ axis where a peak observed by X-ray diffraction (XRD) appears. Whether or not an amorphous phase is generated can be determined by the shape of spectrum of XRD.

[Pentaalkoxyniobium(V)]

Pentaalkoxyniobium(V) is used in the production method according to the present invention as a raw material for producing niobium(V) oxide nanocrystals. Unlike a conventional method, the production method according to the present invention does not use niobium(V) chloride as a raw material, and therefore remaining of chloride ions in the resulting niobium(V) oxide nanocrystals is effectively suppressed so that corrosion caused by chloride ions is easily prevented. Pentaalkoxyniobium(V) may be used singly, or two or more thereof may be used in combination.

Pentaalkoxyniobium(V) is not particularly limited as long as alkoxy groups in the pentaalkoxyniobium(V) are independently an alkoxy group having 2 to 5 carbon atoms. The number of carbon atoms of the alkoxy group is preferably 2 to 4, more preferably 3 or 4, even more preferably 4 from the viewpoint of, for example, reactivity. Examples of the alkoxy group having 2 to 5 carbon atoms include an ethoxy group, a n-propoxy group, an isopropoxy group, a n-butoxy group, an isobutoxy group, a sec-butoxy group, a tert-butoxy group, a n-pentyloxy group, an isopentyloxy group, and a tert-pentyloxy group, and from the viewpoint of, for example, reactivity, an ethoxy group, a n-propoxy group, an isopropoxy group, a n-butoxy group, an isobutoxy group, a sec-butoxy group, and a tert-butoxy group are preferred, a n-propoxy group, an isopropoxy group, a n-butoxy group, an isobutoxy group, a sec-butoxy group, and a tert-butoxy group are more preferred, a n-butoxy group, an isobutoxy group, a sec-butoxy group, and a tert-butoxy group are even more preferred, and a n-butoxy group is particularly preferred.

Specific examples of pentaalkoxyniobium(V) include pentaethoxyniobium(V), penta-n-propoxyniobium(V), pentaisopropoxyniobium(V), penta-n-butoxyniobium(V), pentaisobutoxyniobium(V), penta-sec-butoxyniobium(V), penta-tert-butoxyniobium(V), penta-n-pentyloxyniobium (V), pentaisopentyloxyniobium(V), and penta-tert-pentyloxyniobium(V), and from the viewpoint of, for example, reactivity, pentaethoxyniobium(V), penta-n-propoxyniobium(V), pentaisopropoxyniobium(V), penta-n-butoxyniobium(V), pentaisobutoxyniobium(V), penta-sec-butoxyniobium(V), and penta-tert-butoxyniobium(V) are preferred, penta-n-propoxyniobium(V), pentaisopropoxyniobium(V), penta-n-butoxyniobium(V), pentaisobutoxyniobium(V), penta-sec-butoxyniobium(V), and penta-tert-butoxyniobium (V) are more preferred, penta-n-butoxyniobium(V), pentaisobutoxyniobium(V), penta-sec-butoxyniobium(V), and penta-tert-butoxyniobium(V) are even more preferred, and penta-n-butoxyniobium(V) is particularly preferred.

[Water]

In the production method according to the present invention, hydrolysis of pentaalkoxyniobium(V) proceeds by the reaction of pentaalkoxyniobium(V) and water so that niobium(V) oxide nanocrystals are generated. A molar ratio between water and pentaalkoxyniobium(V) is preferably 0.20 or more, more preferably 0.22 to 7, and even more preferably 0.24 to 5.5. When the molar ratio between water and pentaalkoxyniobium(V) is within the above range, niobium(V) oxide nanocrystals having a size of less than 100 nm, especially a size of less than 20 nm are easily obtained.

[Water-Soluble Solvent]

In the production method according to the present invention, a water-soluble solvent is used as a reaction solvent together with water. In the production method, the water-soluble solvent is used in a much larger amount than water. Specifically, the mass ratio between a water-soluble solvent and water is preferably 50 to 3000, more preferably 80 to 2700, and even more preferably 100 to 2500. When the mass ratio between a water-soluble solvent and water is within the above range, niobium(V) oxide nanocrystals having a size of less than 100 nm, especially a size of less than 20 nm are easily obtained. The reason for this is presumed that slower hydrolysis of pentaalkoxyniobium(V) is likely to more uniformly proceed in an environment where the water-soluble solvent is present in a much larger amount than water. Water-soluble solvents may be used singly, or two or more thereof may be used in combination.

Examples of the water-soluble solvent include: but are not limited to, alcohols such as methanol, ethanol, 1-propanol, 2-propanol, 1-butanol, 2-butanol, 2-methyl-1-propanol, 2-methyl-2-propanol, 1-pentanol, 2-pentanol, 4-methyl-2-pentanol, 2,2-dimethyl-1-propanol, tetrahydrofurfurylalcohol, benzyl alcohol, and phenethyl alcohol; glycols such as ethylene glycol and diethylene glycol; (poly)alkylene glycol monoalkyl ethers such as ethylene glycol monomethyl ether, ethylene glycol monoethyl ether, ethylene glycol-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as diethylene glycol dimethyl ether, diethylene glycol methyl ethyl ether, diethylene glycol diethyl ether, and tetrahydrofuran; ketones such as acetone, methyl ethyl ketone, cyclohexanone, 2-heptanone, and 3-heptanone; lactic acid alkyl esters such as methyl 2-hydroxypropionate and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutanoate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and ethyl 2-oxobutanoate; and amides such as N-methylpyrrolidone, N,N-dimethylformamide, and N,N-dimethylacetamide. Among them, from the viewpoint of easily obtaining niobium(V) oxide nanocrystals having a size of less than 100 nm, especially a size of less than 20 nm, the water-soluble solvent is preferably an alcohol, more preferably 1-butanol, 2-butanol, 2-methyl-1-propanol, 2-methyl-2-propanol, benzyl alcohol, or phenethyl alcohol, even more preferably 1-butanol or benzyl alcohol.

[Hydrothermal Reaction]

In the production method according to the present invention, a mixture containing pentaalkoxyniobium(V), water, and a water-soluble solvent is heated to 255° C. or higher to allow a hydrothermal reaction to proceed. When the heating temperature in the hydrothermal reaction is 255° C. or higher, an amorphous phase of niobium(V) oxide is less likely to be generated, and niobium(V) oxide nanocrystals having a size of less than 100 nm, especially a size of less than 20 nm are easily obtained. The heating temperature in the hydrothermal reaction is preferably 257 to 300° C., more preferably 258 to 280° C., even more preferably 259 to 275° C.

In the production method according to the present invention, the hydrothermal reaction is preferably allowed to proceed at a pressure of 400 psi or more. When the pressure in the hydrothermal reaction is 400 psi or more, an amorphous phase of niobium(V) oxide is less likely to be generated, and niobium(V) oxide nanocrystals having a size of less than 100 nm, especially a size of less than 20 nm are easily obtained. The pressure in the hydrothermal reaction is preferably 420 to 700 psi, more preferably 440 to 600 psi, even more preferably 450 to 580 psi.

In the production method according to the present invention, the time of the hydrothermal reaction is not particularly limited, and may be, for example, 50 to 140 minutes or 60 to 130 minutes. In the production method according to the present invention, niobium(V) oxide nanocrystals having a size of less than 100 nm, especially a size of less than 20 nm are easily obtained in a relatively short time.

Niobium(V) oxide nanocrystals obtained by the production method according to the present invention may be purified by washing with ethanol or the like.

Niobium(V) oxide nanocrystals obtained by the production method according to the present invention can be used as a raw material of a high refractive index material. At this time, the niobium(V) oxide nanocrystals may be treated by, for example, a known capping agent. Examples of the capping agent include alkoxysilane, phenol, alcohol, carboxylic acid, and carboxylic acid halide.

Examples

Hereinafter, the present invention is described in more detail by way of Examples. The present invention is not limited to these Examples.

size (crystallite size) of the niobium(V) oxide nanoparticles by Halder-Wagner method. Results shown in Table 1 were obtained.

Figure 2:
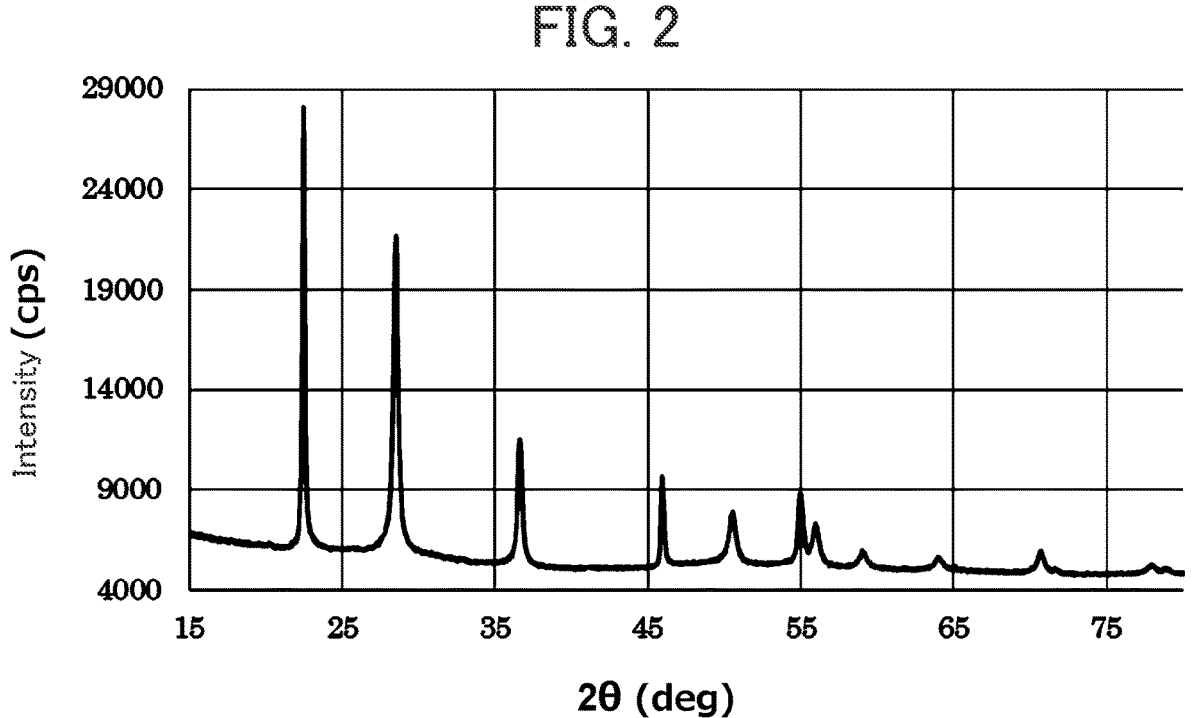
FIG. 2 is a graph showing the result of XRD measurement of niobium(V) oxide nanoparticles of Example 4.

It should be noted that from the result of XRD measurement, the phase of the niobium(V) oxide nanoparticles was analyzed. In Table 1, Am denotes an amorphous phase, TT denotes a TT phase, and Am+TT denotes a mixture of an amorphous phase and a TT phase. For example, as shown in FIG. 1, it was confirmed that in niobium(V) oxide nanoparticles of Comparative Example 5, an amorphous phase and a TT phase were mixed. On the other hand, as shown in FIG. 2, it was confirmed that only a TT phase was present in niobium(V) oxide nanoparticles of Example 4 and niobium(V) oxide nanocrystals were formed. It was confirmed that only a TT phase was present also in niobium(V) oxide nanoparticles of other Examples, and niobium(V) oxide nanocrystals were formed.

TABLE 1

| | | Nb-P (g) | Water (g) | Water/ Nb-P (Molar ratio) | Water-soluble solvent (g) | | Temperature (° C.) | Time (min) | Pressure (psi) | Phase of nanoparticles | Crystallite size (nm) |
|---|---|---|---|---|---|---|---|---|---|---|---|
| | | | | | BA | BuOH | | | | | |
| Comparative | 1 | 9.93 | 0.80 | 2.0 | 226.7 | 0 | 220 | 300 | 258 | Am | — |
| Example | 2 | 9.93 | 0.80 | 2.0 | 226.7 | 0 | 235 | 420 | 315 | Am + TT | 23 |
| | 3 | 9.93 | 0.10 | 0.25 | 227.4 | 0 | 235 | 420 | 350 | Am + TT | 18 |
| | 4 | 9.93 | 0.10 | 0.25 | 227.4 | 0 | 235 | 240 | 320 | Am + TT | 15 |
| | 5 | 9.93 | 2.0 | 5.0 | 225.5 | 0 | 235 | 225 | 320 | Am + TT | — |
| | 6 | 9.93 | 0.40 | 1.0 | 227.1 | 0 | 250 | 100 | 345 | Am | — |
| | 7 | 9.93 | 0.50 | 1.3 | 227.0 | 0 | 250 | 120 | 398 | Am | — |
| Example | 1 | 9.93 | 0.50 | 1.3 | 227.0 | 0 | 260 | 120 | 480 | TT | 17 |
| | 2 | 9.93 | 0.80 | 2.0 | 226.7 | 0 | 260 | 100 | 470 | TT | 14 |
| | 3 | 9.93 | 0.10 | 0.25 | 227.4 | 0 | 260 | 90 | 453 | TT | 12 |
| | 4 | 9.93 | 0.50 | 1.3 | 227.0 | 0 | 270 | 100 | 570 | TT | 14 |
| | 5 | 9.93 | 2.0 | 5.0 | 225.5 | 0 | 270 | 70 | 566 | TT | 13 |
| | 6 | 9.93 | 2.0 | 5.0 | 220.5 | 5.00 | 270 | 70 | 561 | TT | 15 |

Nb-P: Penta-n-butoxyniobium (V)

BA: Benzyl alcohol

BuOH: 1-butanol

Am: Amorphous phase

TT: TT phase

[Preparation of Niobium(V) Oxide Nanoparticles]

As raw materials, penta-n-butoxyniobium(V), water, benzyl alcohol, and 1-butanol were placed in amounts shown in Table 1 in a 600-mL reactor (manufactured by Parr Instrument Company) in an inert atmosphere. A reaction mixture was heated with stirring at a temperature rise rate of 2 to 3° C./min. After the reaction mixture reached a temperature shown in Table 1, a hydrothermal reaction was allowed to proceed for a time period shown in Table 1, and as a result, a reaction pressure reached a value shown in Table 1. After the reaction was completed and the temperature of the reactor was reduced to room temperature, niobium(V) oxide nanoparticles obtained in the above manner were collected as a white milky suspension (wet cake).

[Measurement of Size]

A vacuum-dried product of the wet cake obtained in the above manner was used as a sample to perform XRD measurement of the niobium(V) oxide nanoparticles with an X-ray diffractometer (SmartLab, manufactured by Rigaku Corp.). The obtained result was analyzed with accompanying software PDXL to determine an average primary particle As can be seen from Table 1, it was confirmed that in the Examples, single-phase niobium(V) oxide nanocrystals having a size of less than 100 nm, especially a size of less than 20 nm were obtained, but in the Comparative Examples, an amorphous phase was generated.

What is claimed is:

1. A production method of niobium(V) oxide nanocrystals, comprising heating a mixture containing pentaalkoxyniobium(V), water, and a water-soluble solvent to 255° C. or higher to allow a hydrothermal reaction to proceed, wherein the niobium(V) oxide nanocrystals have a size of less than 20 nm, and alkoxy groups in the pentaalkoxyniobium(V) are independently an alkoxy group having 2 to 5 carbon atoms.

2. The production method according to claim 1, wherein a molar ratio between water and pentaalkoxyniobium(V) is 0.20 or more.

3. A production method of niobium(V) oxide nanocrystals, comprising heating a mixture containing pentaalkoxyniobium(V), water, and a water-soluble solvent to 255° C. or higher to allow a hydrothermal reaction to proceed, wherein the hydrothermal reaction proceeds at a pressure of 400 psi or more, and alkoxy groups in the pentaalkoxyniobium(V) are independently an alkoxy group having 2 to 5 carbon atoms.

* * * * *